US006100886A

United States Patent [19]

Lin

[11] Patent Number: 6,100,886

[45] Date of Patent: *Aug. 8, 2000

[54] HELP SERVICE FUNCTION CONTROL DEVICE ADDED TO A MULTI-CHANNEL MONITOR OF A PERSONAL COMPUTER

[75] Inventor: Yi-Jen Lin, Taipei, Taiwan

[73] Assignee: Tatung Co., Ltd., Taipei, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 09/025,548

[22] Filed: Feb. 18, 1998

[51] Int. Cl.[7] .................................................. G06K 15/00

[52] U.S. Cl. .............................. 345/336; 345/10; 345/11; 348/177

[58] Field of Search .................................... 345/336, 337, 345/338, 10, 3, 11, 970, 327; 348/177, 179

[56] References Cited

U.S. PATENT DOCUMENTS

| | | | |
|---|---|---|---|
| 4,618,858 | 10/1986 | Belch | 345/340 |
| 5,287,448 | 2/1994 | Nicol | 345/338 |
| 5,337,408 | 8/1994 | Fung et al. | 345/10 |
| 5,416,535 | 5/1995 | Sato | 348/564 |
| 5,475,500 | 12/1995 | Takeda | 358/442 |
| 5,530,621 | 6/1996 | Choy | 361/728 |
| 5,530,869 | 6/1996 | Salle | 395/701 |
| 5,640,195 | 6/1997 | Chida | 348/13 |
| 5,781,247 | 7/1998 | Wehmeyer | 348/569 |
| 5,828,351 | 10/1998 | Wu | 345/10 |
| 5,883,476 | 3/1999 | Noguchi et al. | 348/177 |
| 5,887,147 | 3/1999 | Arai et al. | 345/10 |
| 5,898,147 | 4/1999 | Domzalski | 200/1 B |
| 5,966,124 | 10/1999 | Devine et al. | 345/10 |
| 5,990,881 | 11/1999 | Inoue et al. | 345/327 |

FOREIGN PATENT DOCUMENTS

| | | |
|---|---|---|
| 29617197 | 11/1996 | Germany . |
| 3469548 | 4/1994 | Japan . |
| 9469548 | 4/1994 | Japan . |

*Primary Examiner*—Raymond J. Bayerl
*Assistant Examiner*—Thomas Joseph
*Attorney, Agent, or Firm*—Bacon & Thomas, PLLC

[57] ABSTRACT

A help service function control device is added to a multi-sync(or multi-modc)monitor of a personal computer. The control device uses a micro controller and an on-screen display to control a video display to show the contents of "Help Service". The help service contains Install. Adjustment and Specification instructions for instructing the user to install and adjust the monitor and to understand the specifications of the monitor. The micro controller picks up a serial signal from the on-screen display, permitting the fetched signal to be amplified by a video pre-amplifier and then displayed through the video display so as to help the user eliminate troubles.

5 Claims, 14 Drawing Sheets

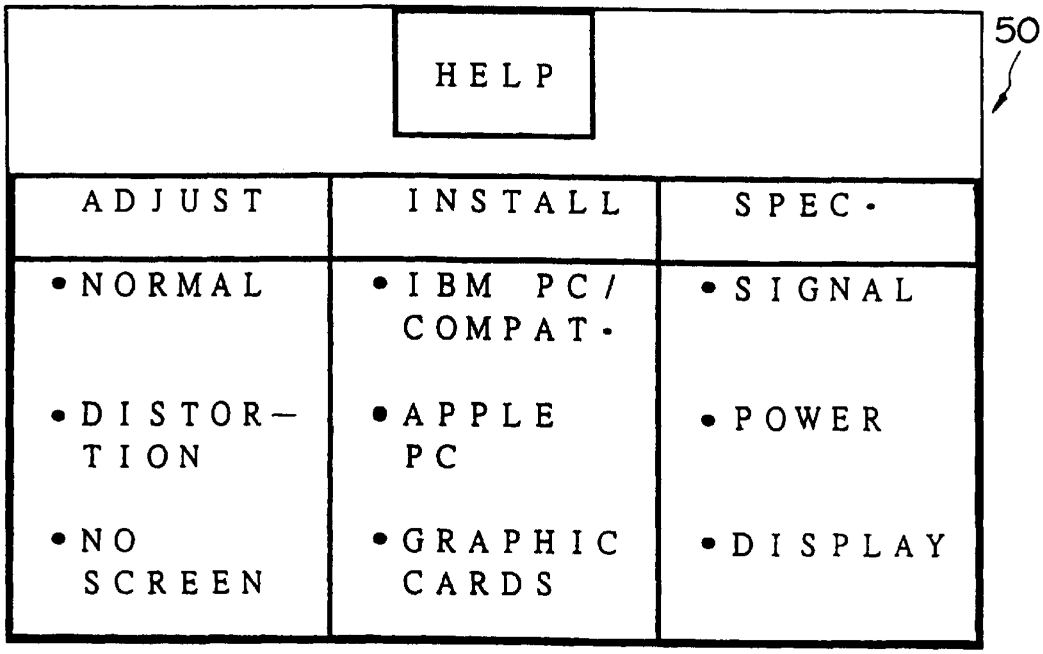
FIG. 6
FIG. 7a
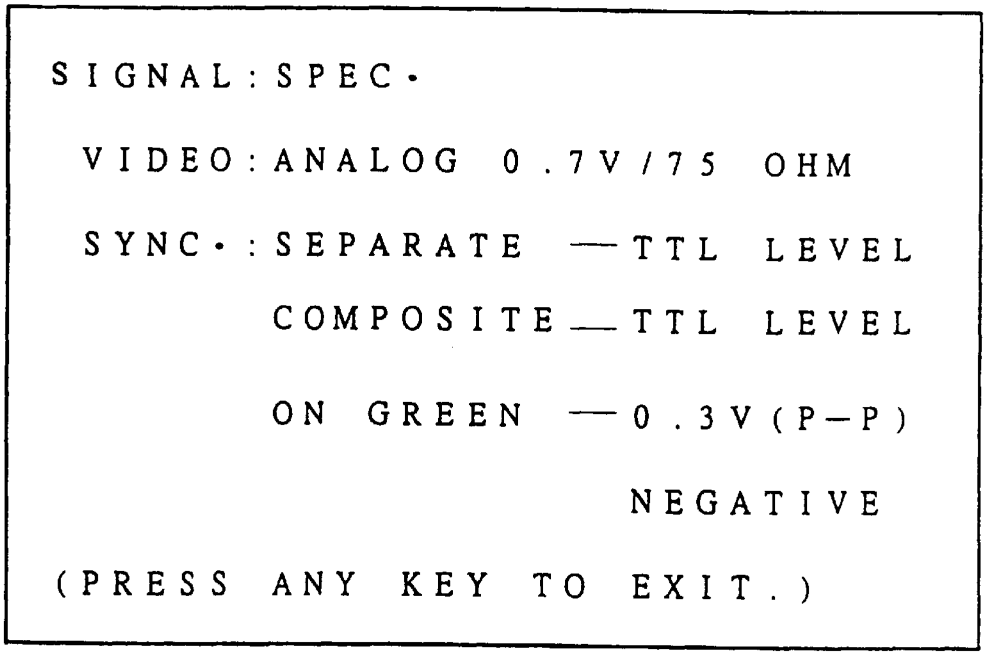

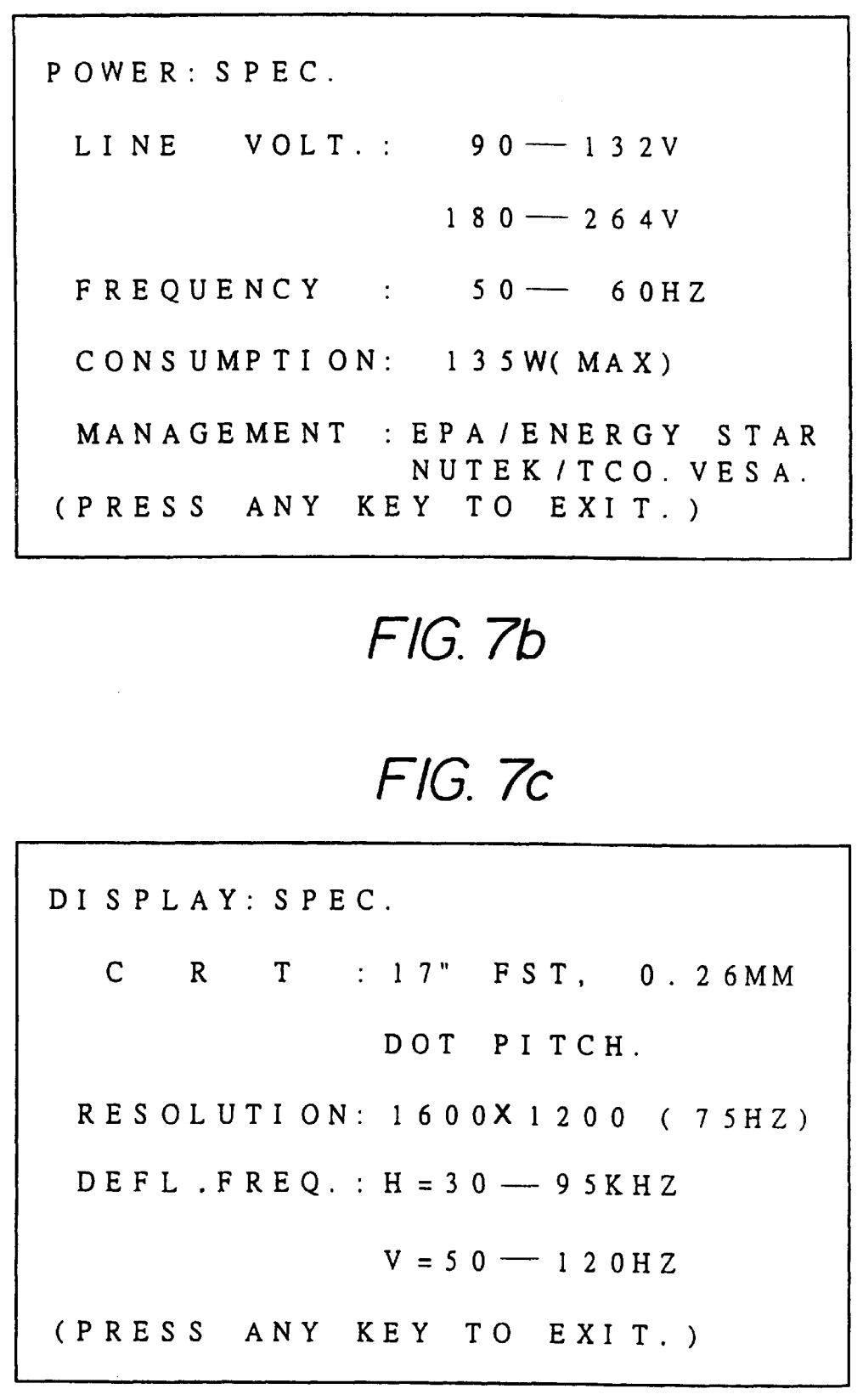

POWER: SPEC.

LINE VOLT.: 90—132V

180—264V

FREQUENCY : 50— 60HZ

CONSUMPTION: 135W(MAX)

MANAGEMENT : EPA/ENERGY STAR
NUTEK/TCO. VESA.

(PRESS ANY KEY TO EXIT.)

FIG. 7b

FIG. 7c

DISPLAY: SPEC.

CRT : 17" FST, 0.26MM

DOT PITCH.

RESOLUTION: 1600X1200 (75HZ)

DEFL.FREQ.: H=30—95KHZ

V=50—120HZ (PRESS ANY KEY TO EXIT.)

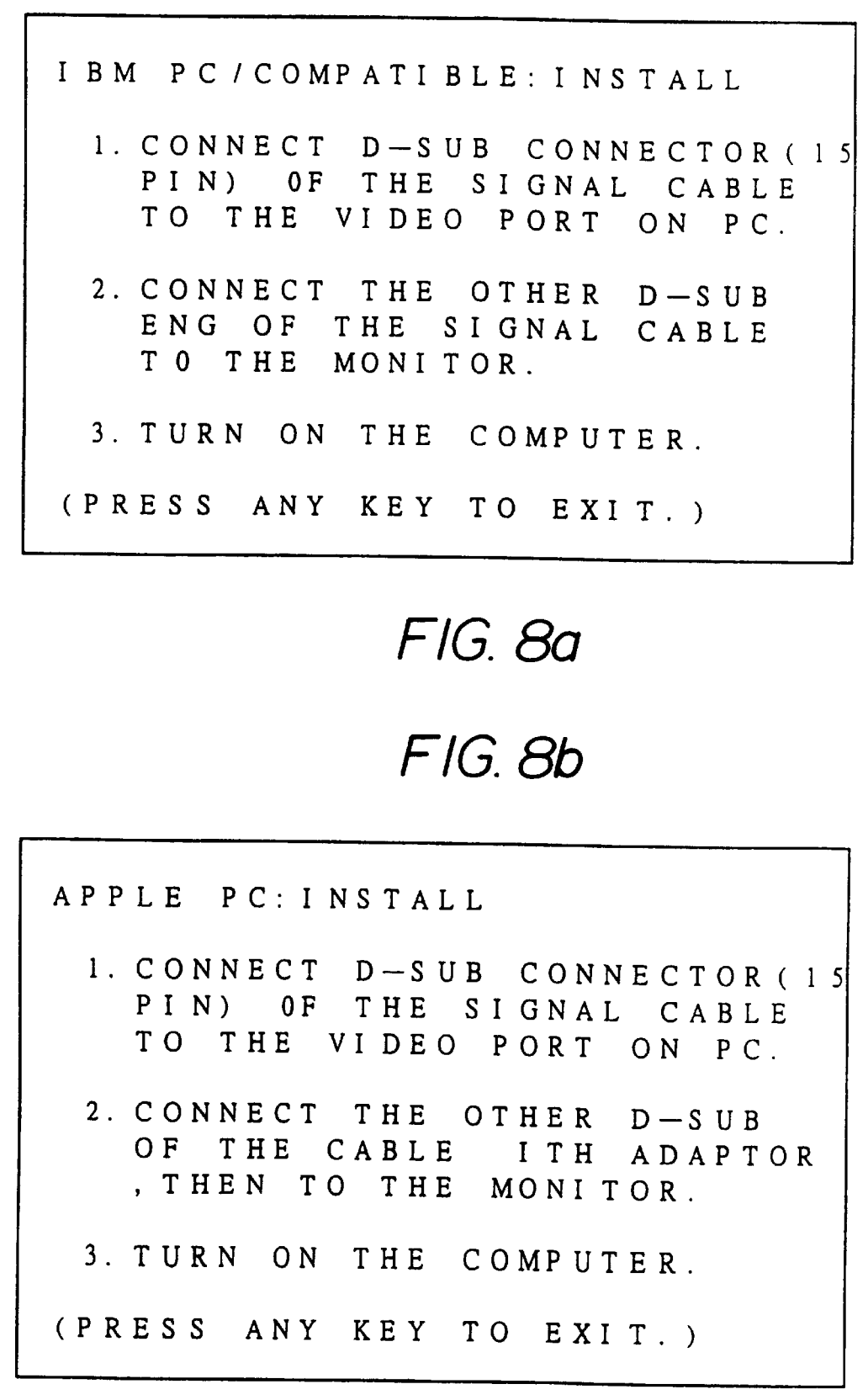

IBM PC/COMPATIBLE: INSTALL

1. CONNECT D-SUB CONNECTOR(15 PIN) OF THE SIGNAL CABLE TO THE VIDEO PORT ON PC.

2. CONNECT THE OTHER D-SUB ENG OF THE SIGNAL CABLE TO THE MONITOR.

3. TURN ON THE COMPUTER.

(PRESS ANY KEY TO EXIT.)

FIG. 8a

FIG. 8b

APPLE PC: INSTALL

1. CONNECT D-SUB CONNECTOR(15 PIN) OF THE SIGNAL CABLE TO THE VIDEO PORT ON PC.

2. CONNECT THE OTHER D-SUB OF THE CABLE ITH ADAPTOR, THEN TO THE MONITOR.

3. TURN ON THE COMPUTER.

(PRESS ANY KEY TO EXIT.)

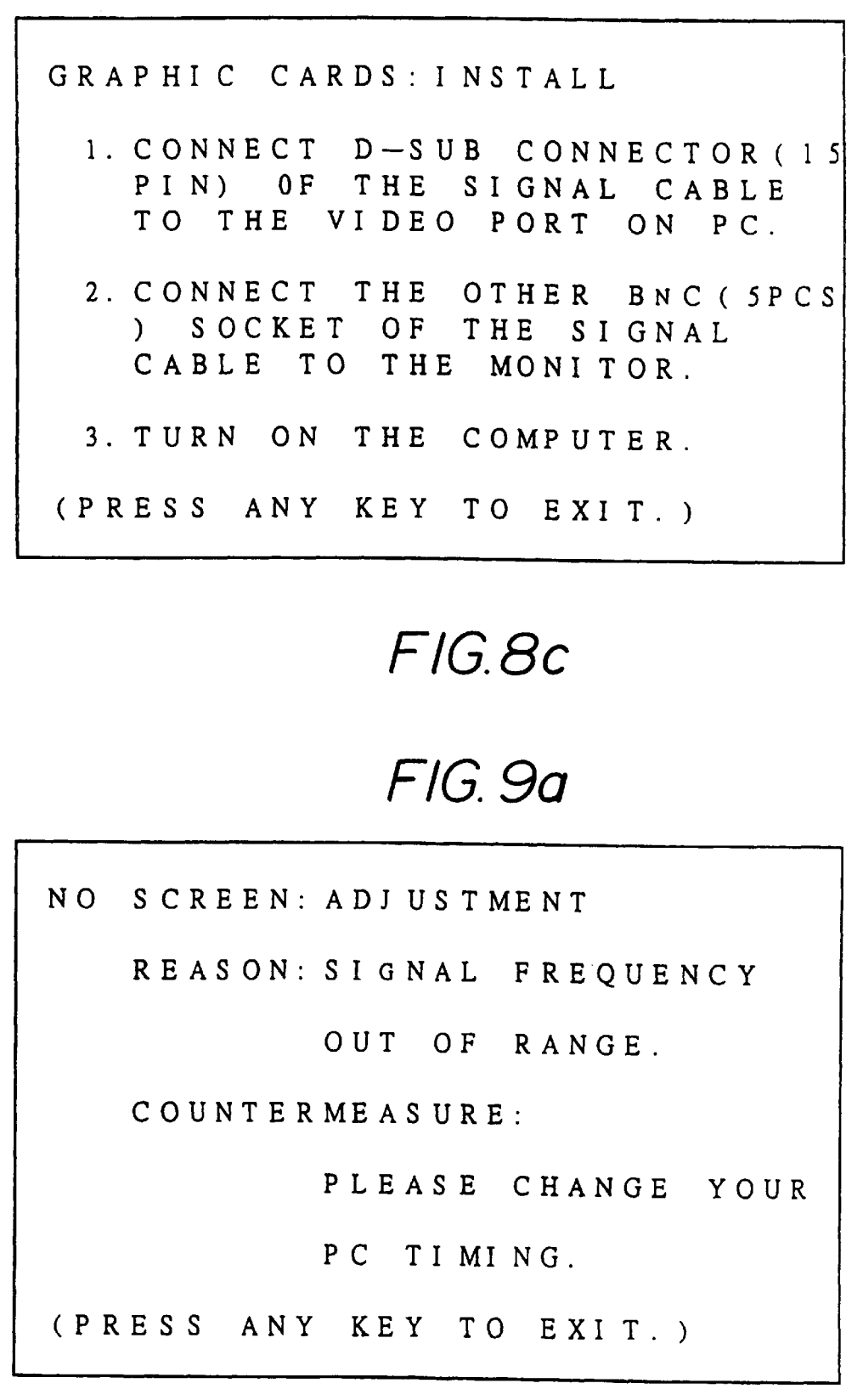

GRAPHIC CARDS: INSTALL

1. CONNECT D-SUB CONNECTOR(15 PIN) OF THE SIGNAL CABLE TO THE VIDEO PORT ON PC.

2. CONNECT THE OTHER BNC(5PCS) SOCKET OF THE SIGNAL CABLE TO THE MONITOR.

3. TURN ON THE COMPUTER.

(PRESS ANY KEY TO EXIT.)

FIG. 8c

FIG. 9a

NO SCREEN: ADJUSTMENT

REASON: SIGNAL FREQUENCY OUT OF RANGE.

COUNTERMEASURE:

PLEASE CHANGE YOUR PC TIMING.

(PRESS ANY KEY TO EXIT.)

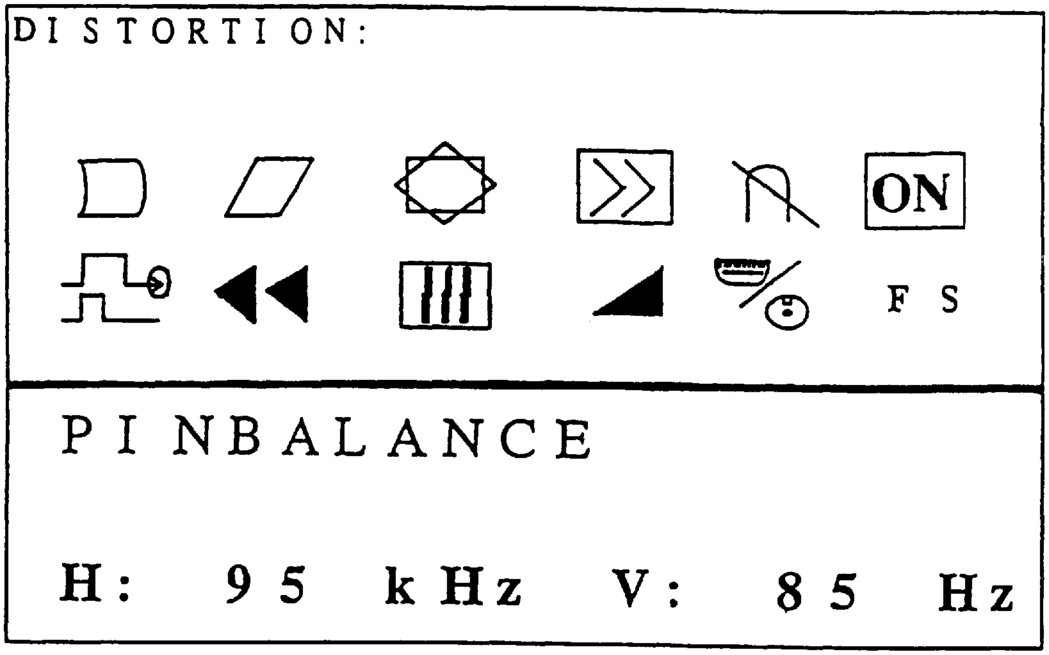
FIG. 9b
FIG. 9c
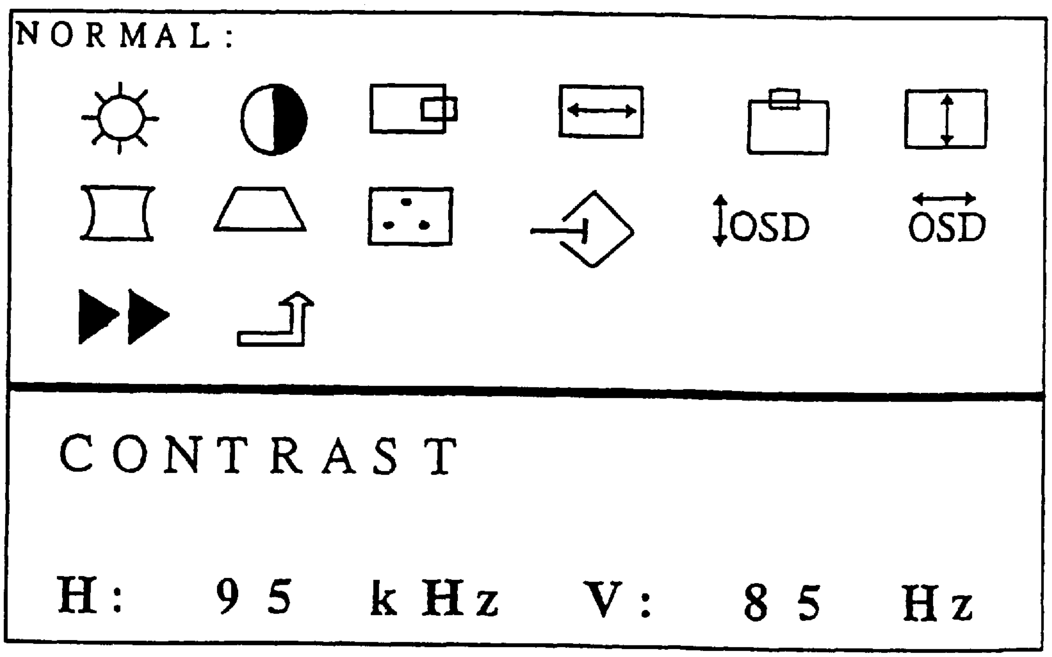

HELP SERVICE FUNCTION CONTROL DEVICE ADDED TO A MULTI-CHANNEL MONITOR OF A PERSONAL COMPUTER

BACKGROUND OF THE INVENTION

The present invention relates to a help service function control device, and more particularly to such a help service function control device which is added to a multi-channel monitor of a personal computer.

A variety of personal computers have been intensively used in offices as well as in families. A personal computer either purchased from the manufacturer or distributor, or assembled by oneself, comprises a monitor for showing the user's input message or the computer's execution result. When one wishes to install a computer monitor, the manual supplied from the monitor manufacture must be well reviewed. However, few people have the patience to review the manual thoroughly. When encountering trouble during installation, one must ask the supplier for help.

Furthermore, when the user upgrades the computer, the installation of the current monitor to the new computer may have to be adjusted.

FIG. 1 shows a regular monitor in which ICON adjustment control is achieved through a micro controller 10, a memory 20 and an on-screen display 40. The items of adjustment includes vertical height, horizontal width, vertical position, etc. The operation procedure is as follows. When entering the enter key 31, a window 50 appears on the video display of the monitor (see FIG. 2*a*); the icon of the window 50 is divided into a function sign area 51, and an explanation area 52. The number and item of functional signs in the function sign area 51 can be adjusted as desired, and the user can use the cursor to select the desired function sign. The explanation area 52 is to explain the function sign selected. The selector key 32 is for selecting the desired function sign. For example, to adjust "Contrast", the enter key 31 is clicked, and a contrast level (graduations) is shown in the window, see FIG. 2*b*, and the user can then uses the selector key 32 to adjust the contrast level value. The window 50 disappears if the selector key 32 or enter key 31 does no work for 5 seconds, and the contrast level value is automatically stored in the memory 20. The composition of the signs or characters (see FIGS. 3*a* and 3*b*) is generated by the on-screen display 40.

SUMMARY OF THE INVENTION

The present invention provides a help service function control device which is added to a multi-sync(or multi-mode )channel monitor of a personal compute The content of "Help Service" is shown through the video display by means of the control of the micro controller and the on-screen display. The content of "Help Service" includes three items, namely, the installation, the adjustment, and the specification. The installation help service is provides instructions for connection between the monitor and the computer. The specification help service provides input characteristics, resolution and security confirmation of the monitor.

According to the preferred embodiment of the present invention, the help service function control device comprises a micro controller controlled to produce a function selection message and a level adjustment message for managing the operation and adjustment control of the connected monitor; a control switch unit having at least two control switches for controlling the micro controller to produce the function selection message and the level adjustment message respectively; an on-screen display controlled by the micro controller to produce characters and signs, and to output produced characters and signs to a video pre-amplifier, permitting a help service message to be displayed on a video display; and memory means for access of set data when the micro controller is running a function selection or level adjustment.

When encountering problems regarding installation, adjustment or specification, the user can then operate the enter key and selector key of the control switch unit on the control panel of the monitor. Upon receipt of a control signal from the control switch unit, the micro controller immediately controls the on-screen display to show the content of "Help Service" on the video display. The video display can be a CRT (cathode-ray tube), LCD (liquid crystal display) or PDP (plasma display panel). Through the help of "Help Service". the user can solve the problems by oneself without asking the supplier or maintenance engineer for help.

BRIEF DESCRIPTION OF THE DRAWINGS

FIG. 6 shows the homepage of the help service according to the present invention.

FIG. 7*a* shows the specification of input signal of the monitor according to the present invention.

FIG. 7*b* shows the specification power of the monitor according to the present invention.

FIG. 7*c* shows the specification of display of the monitor according to the present invention.

FIG. 8*a* shows the installation procedure of IBM PC/compatible according to the present invention.

FIG. 8*b* shows the installation procedure of Apple PC according to the present invention.

FIG. 8*c* shows the installation procedure of graphic cards according to the present invention, FIG. 9*a* shows the adjustment procedure under no screen according to the present invention.

FIG. 9*b* shows the adjustment procedure under distortion according to the present invention.

FIG. 9*c* shows the adjustment procedure under normal.

DETAILED DESCRIPTION OF THE PREFERRED EMBODIMENT

The present invention uses an electric circuit to match with a software in providing a "Help Service" message on the video display of a monitor, and controlling the service function shown.

Figure 4A:
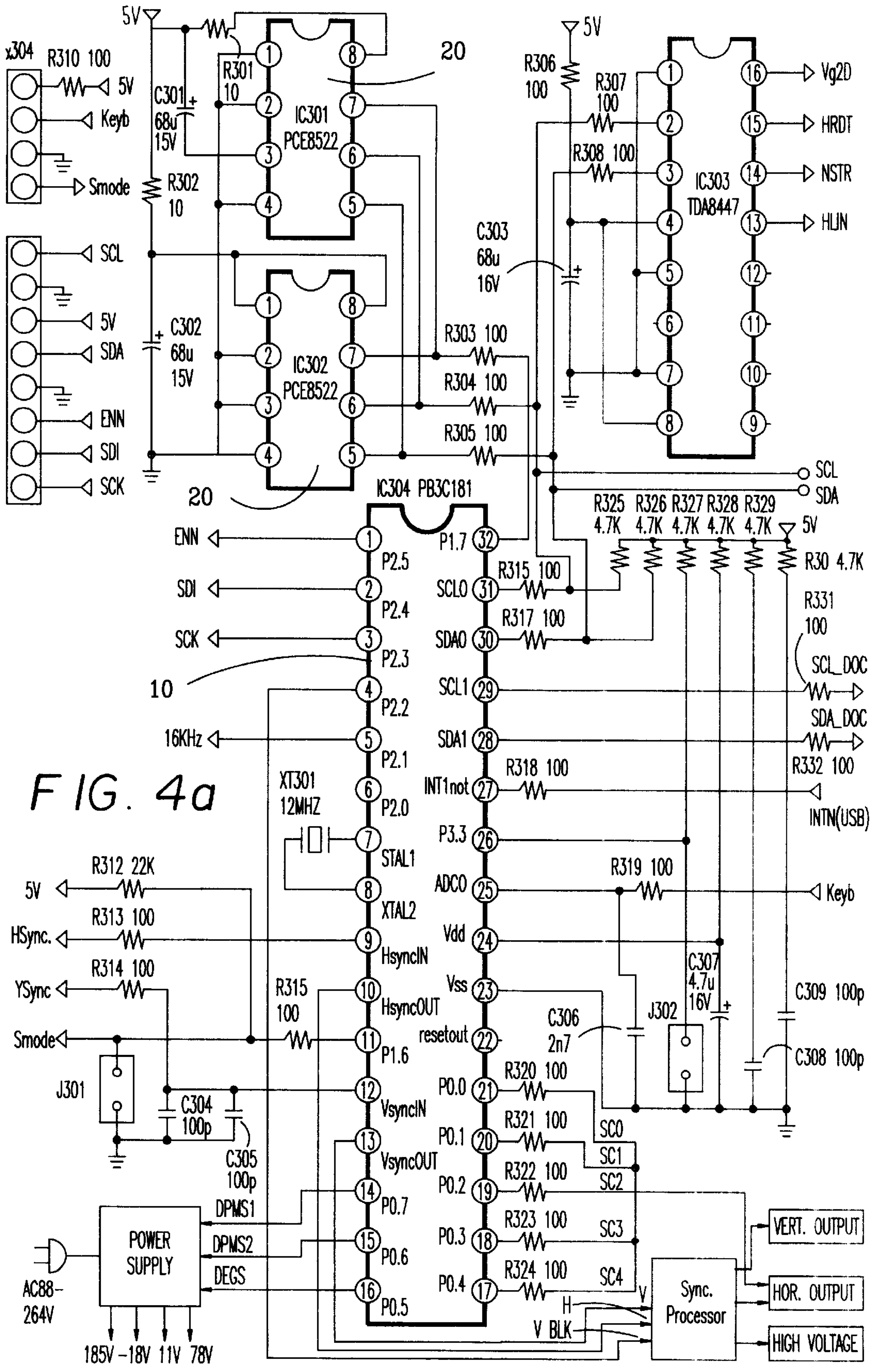
FIG. 4*a* is a circuit diagram of the present invention (Part I).
Figure 4B:
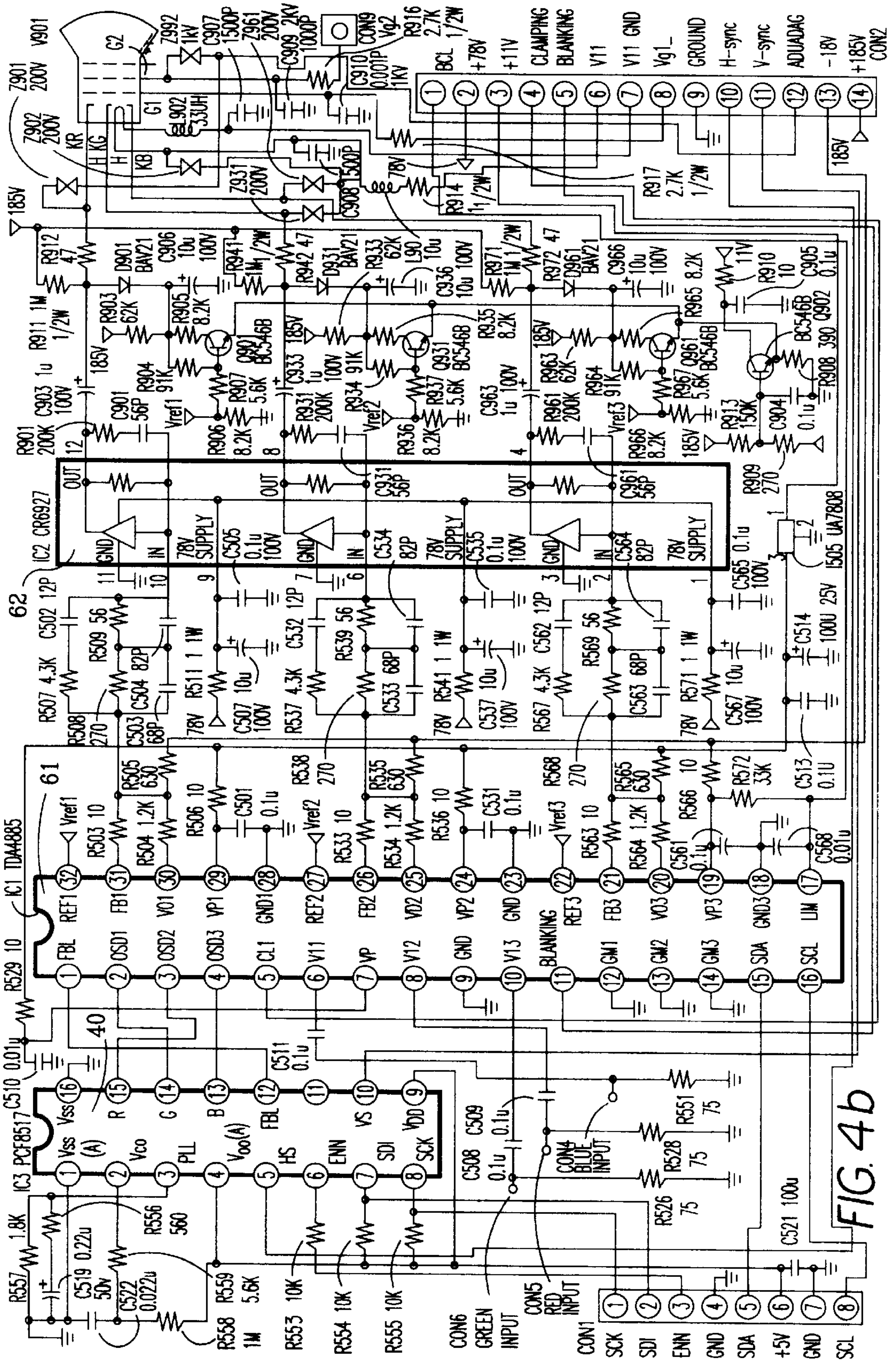
FIG. 4*b* is a circuit diagram of the present invention (Part II).
Figure 5:
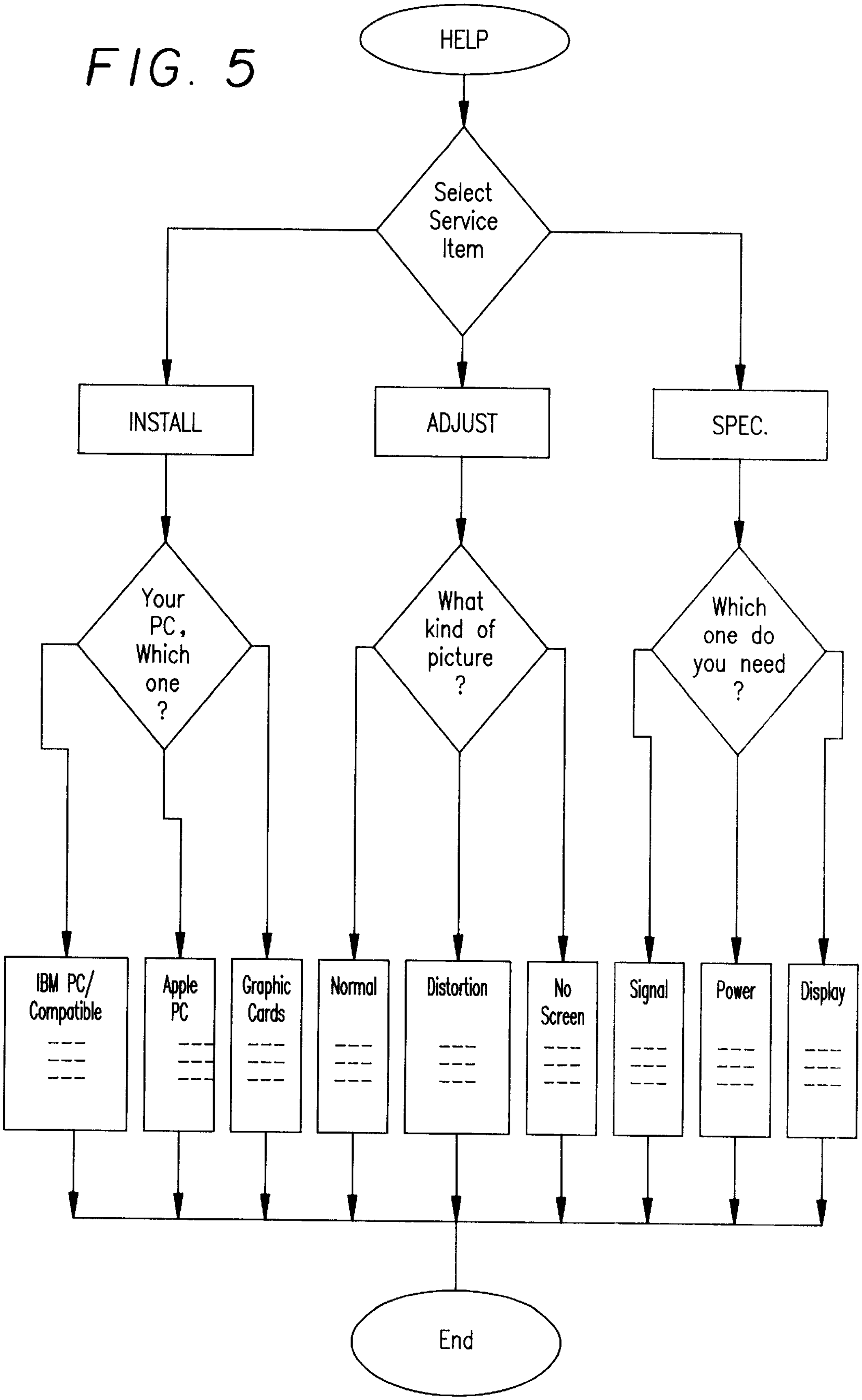
FIG. 5 is a help service operation flow chart according to the present invention.

Referring to FIG. 4*a* the micro controller 10 is obtained from $IC_{304}$ of P83C181. The memory 20 includes $IC_{301}$ and $IC_{302}$ that are EEPROMs (electronically erasable programmable read-only memory) obtained from PCE8522. The socket $X_{304}$ is connected to the control switch unit 30 on the front panel of the monitor. The control switch unit 30 comprises a selector key 32 and a help/enter key 31 (hereinafter referred to as the enter key; the enter key 31 runs the help function when clicked for the first time, and then runs the enter iunction when clicked a second time). The S-mode (service mode) terminal of the socket $X_{304}$ is connected to the help/enter key 31 of the control switch unit 30. The key b terminal is connected to the selector key 32 of the control switch unit 30. In FIG. 4*b*, the on-screen display 40 is obtained from $IC_3$ of PCF8517. The input port of the OSD (on-screen display) 40 is connected to the socket $CON_1$, then connected to the socket X303 shown in FIG. 4*a* by lead wires, and then connected to the micro controller 10. The output port (Pin 12, 13, 14 and 15) of the OSD 40 is connected to the video pre-amplifier 61 (the video pre-amplifier 61 is obtained from $IC_1$ of TDA4885) and CRT driver 62 of a video processor circuit 60. The codes shown in FIGS. 4*a* and 4*b* are defined as follows:

SDA: $1^2$C-bus serial data input/output

SCL: $I^2$C-bus clock input

ENN: active LOW input to enable serial interface

SDI: data input of serial interface

SCK: clock input of serial interface

SDA and SCL are for intercommunication and data fetching between $IC_{304}$, $IC_{301}$, $IC_{302}$ and $IC_1$. ENN, SDI and SCK work only when under the help service mode.

When the enter key is clicked, Pin 4 of the socket $X_{304}$ which is connected to Pin 11 of the micro controller 10 is at low potential, and therefore the micro controller 10 enters the service mode.

1. SDAO (Pin 30) port and SCLO (Pin 31) port provide an on-screen display message to the socket $CON_1$ shown in FIG. 4*b* through the inter-integrated circuit bus via the socket $X_{303}$, and then to SDA (Pin 15) and SCL (Pin 16) of the video pre-amplifier 61, informing the video pre-amplifier 61 to stop receiving video signals (Pins 6, 8 and 10 of $IC_1$) from the external personal computer during the timing shown in the help service function time window 50, so as to prevent a conflict with the video signal (Pins 2, 3 and 4 of $IC_1$) from the OSD 40.

Figure 1:
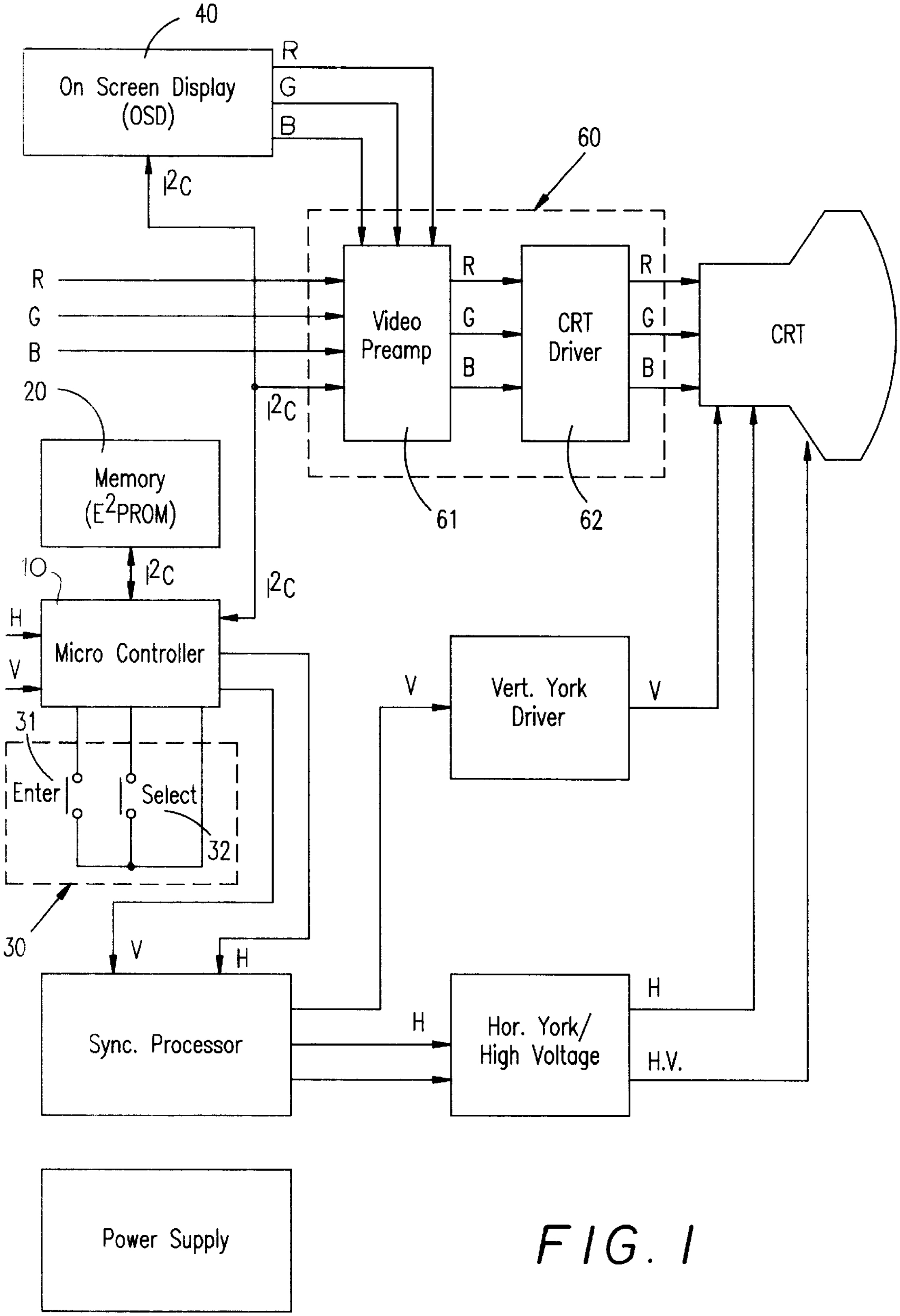
FIG. 1 is a circuit block diagram of a multi-sync(or multi-mode)monitor according to the prior art.
Figure 2A:
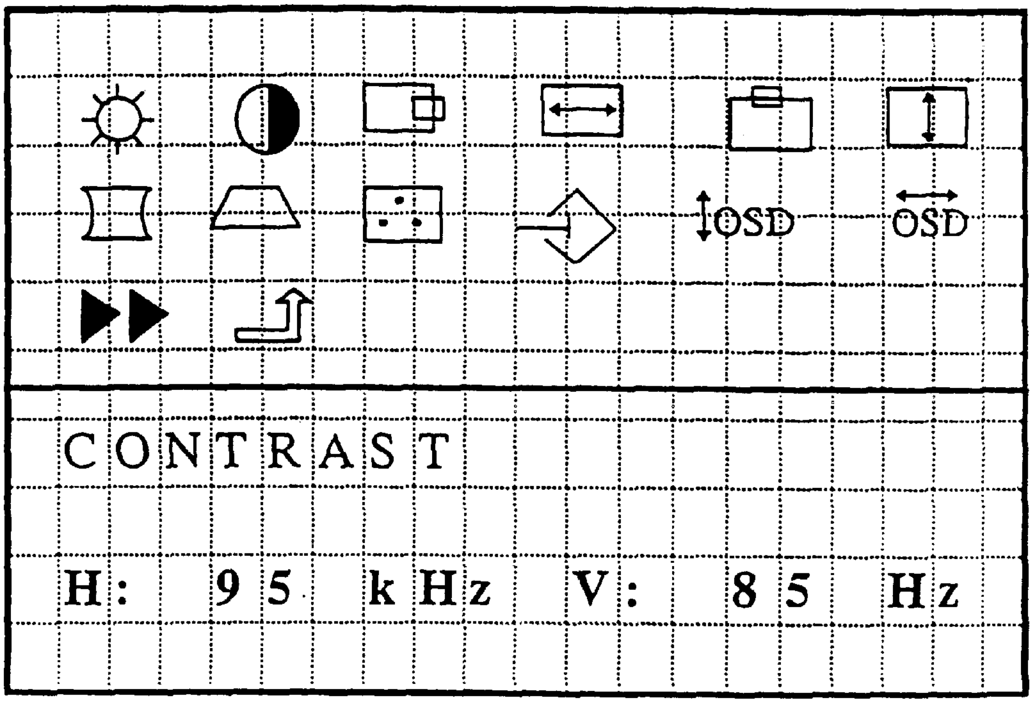
FIG. 2*a* shows the icon of a window on the multi-channel monitor according to the prior art.
Figure 2B:
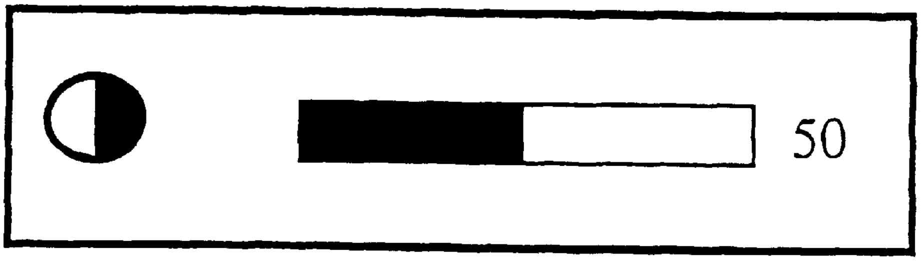
FIG. 2*b* shows a contrast level adjustment picture on the multi-sync(or multi-mode)monitor according to the prior art.
Figure 3A:
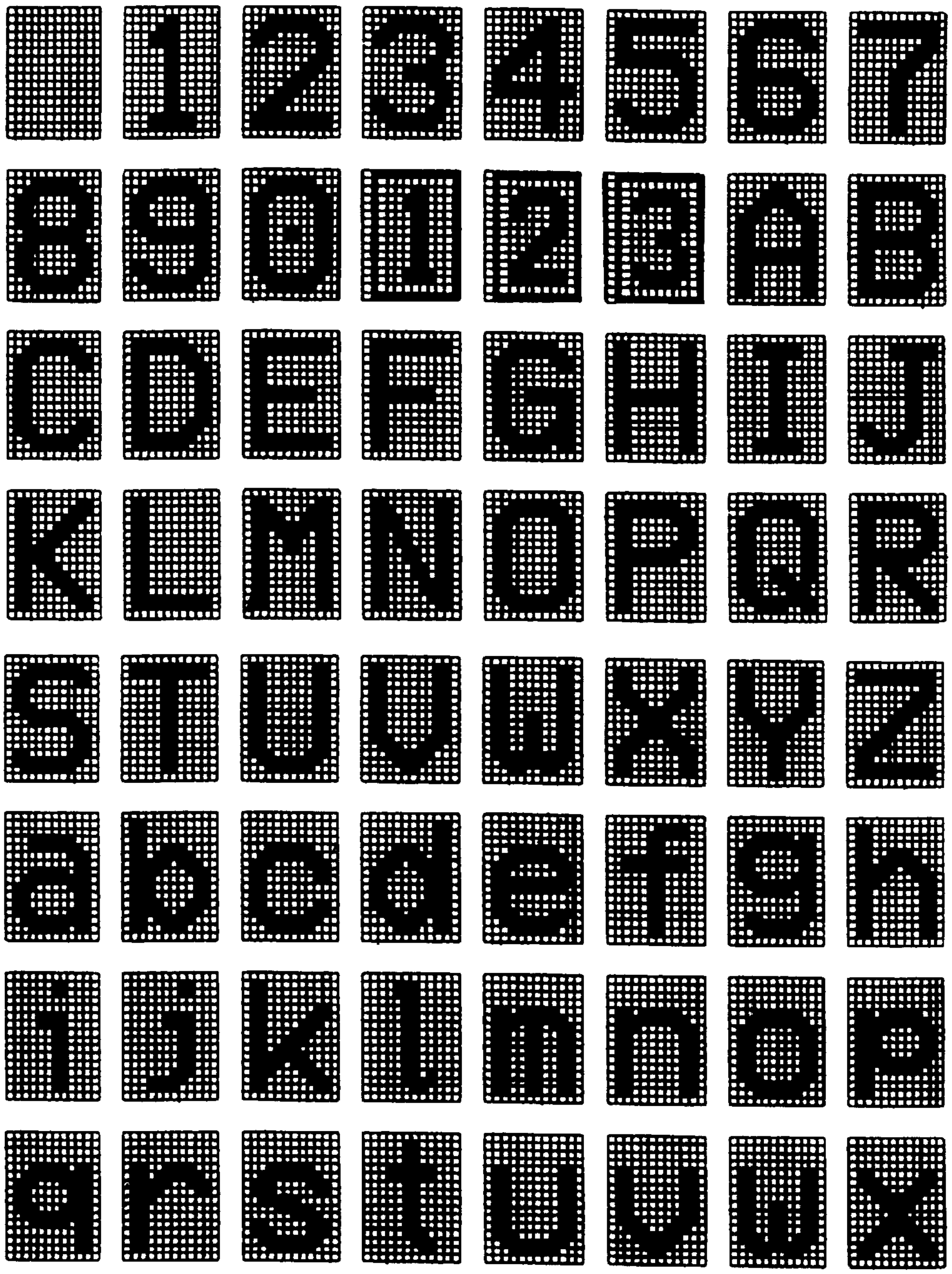
FIG. 3*a* shows a table of numbers and letters of the on-screen display of the multi-sync(or multi-mode)monitor according to the prior art.
Figure 3B:
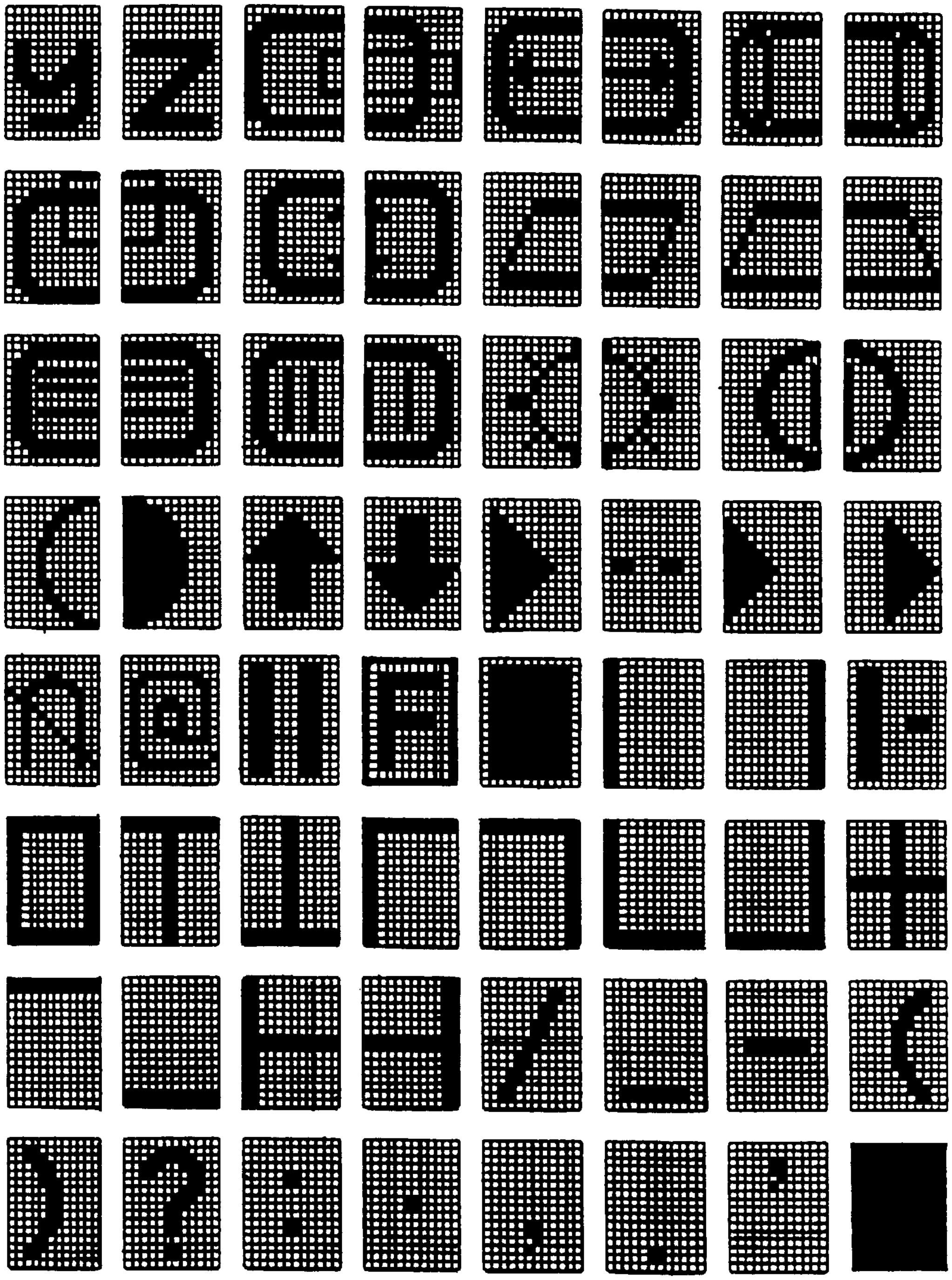
FIG. 3*b* shows a table of signs of the on-screen display of the multi-sync(or multi-mode)monitor according to the prior art.

2. ENN (Pin 1) is at low potential, OSD 40 is enabled, thereby causing the SCK (Pin 3) port and SDI (Pin 2) port to provide a serial message, for example, character address to the socket $CON_1$ shown in FIG. 4*b* through the socket $X_{303}$, and then to SCK (Pin 8) and SDI (Pin 7) of the OSD 40, informing the OSD 40 to output the letter or pattern shown in FIGS. 3*a* and 3*b* subject to the character address during the timing shown in the help service function time window 50.

The above statement describes the circuit operation of the window 50 to show the text on the video display.

The operation of the present invention is described hereinafter by way of an example.

When first pressing the enter key, the window 50 shows the content as shown in FIG. 6, the cursor is positioned at HELP, and the frame of HELP keeps flashing, telling the user about its location. Thereafter, the selector key 32 is operated to shift the cursor, causing the outer frame of INSTALL, ADJUST or SPEC. to flash. Then, the enter key 31 is pressed to shift the cursor to the black point at the left side of for example SIGNAL, causing the black point to flash. When the selector key 32 is depressed again and again, the cursor is shifted from SIGNAL to POWER and then to DISPLAY, and then returned to SIGNAL, and so on. If POWER is selected, the enter key 31 is clicked again. causing the window 50 to show the content shown in FIG. 7. In the same manner, the user can select any item for help service in ADJUST, INSTALL or SPEC. Further, a tact switch or encoder 33 can be used for the control switch unit 30.

Figure 10C:
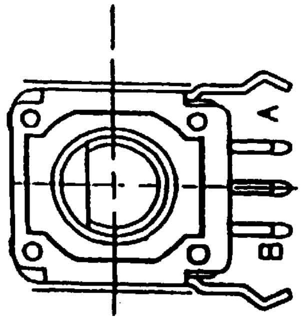
FIG. 10*c* is a front view of the encoder shown in FIG. 10*a*.
Figure 10B:
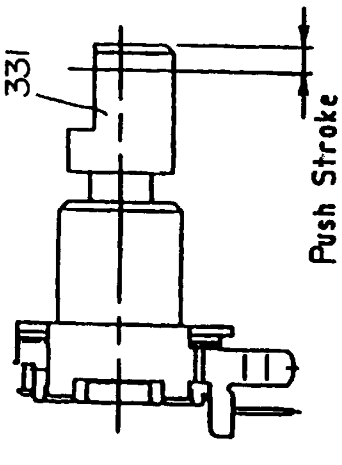
FIG. 10*b* is a side view of the encoder shown in FIG. 10*a*.
Figure 10A:
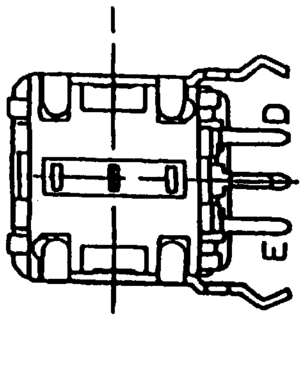
FIG. 10*a* is a rear side view of an encoder according to the present invention.
Figure 10E:
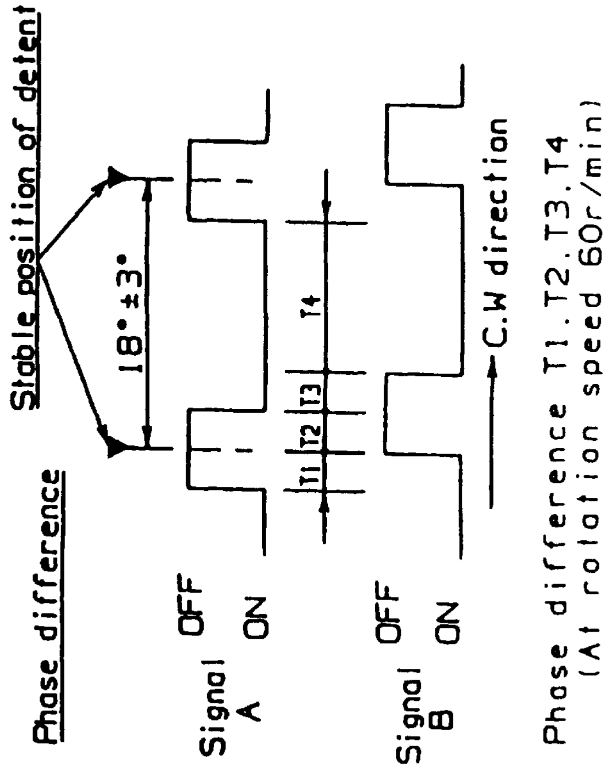
FIG. 10*e* shows the signal output waveform of the encoder under increase selection control.
Figure 10D:
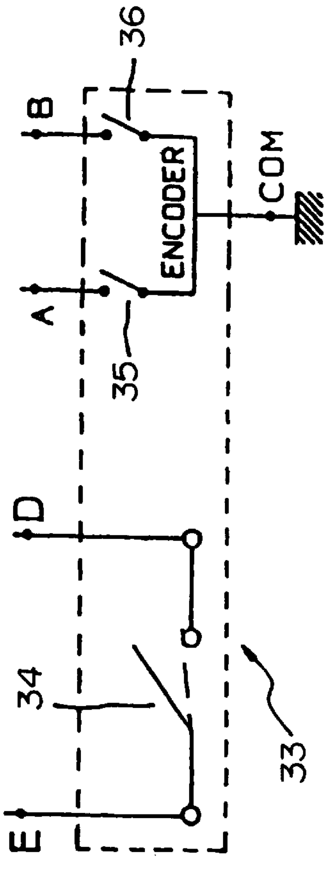
FIG. 10*d* is a circuit diagram of the encoder according to the present invention.
Figure 10F:
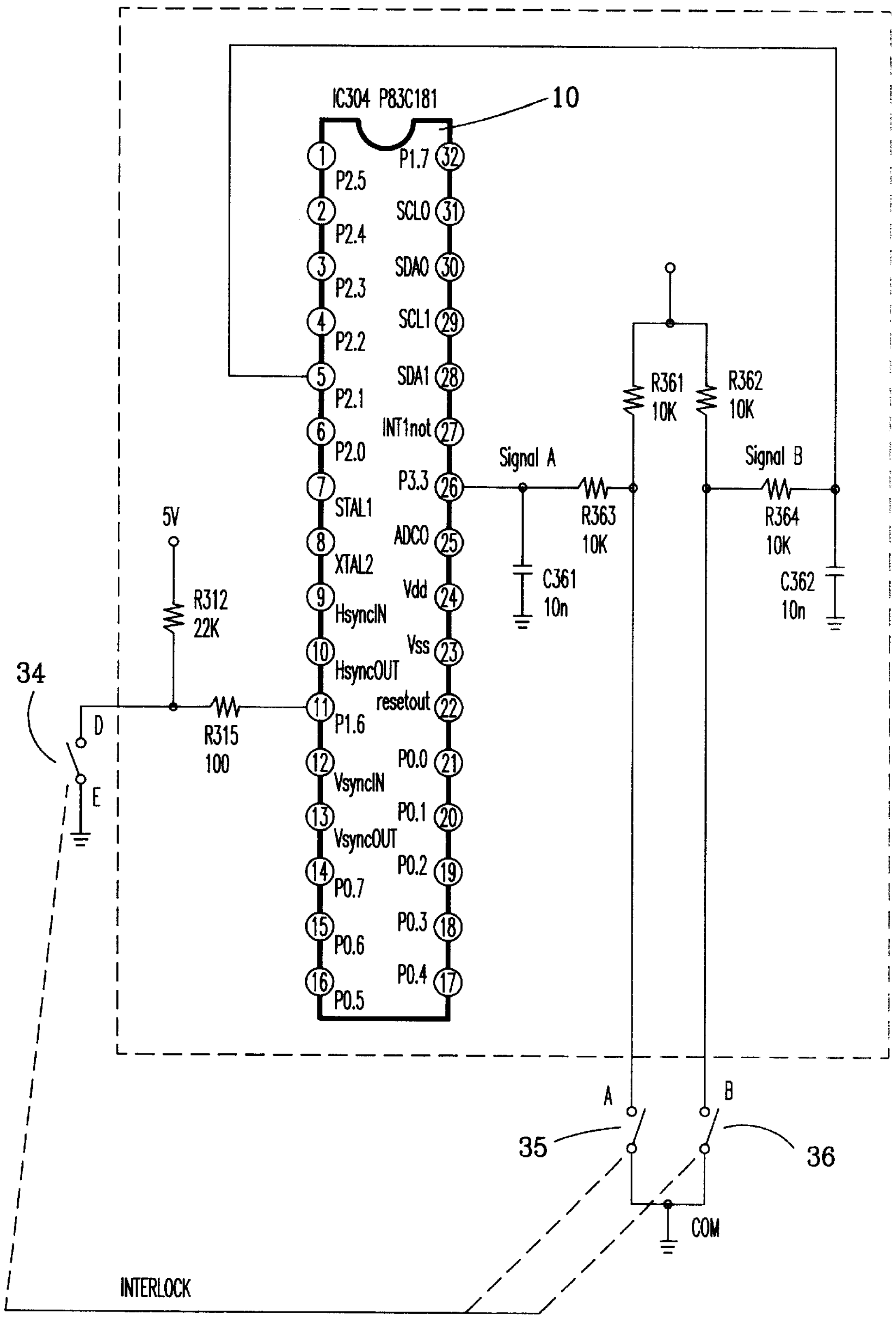
FIG. 10*f* is a circuit diagram of the encoder according to the present invention.

Referring to FIGS. from 10*a* to 10*d*, when encoder 33 is used for the control switch unit 30, contacts D and E form an enter key 34; contacts A and B are stelector keys 35;36. The connection between the micro controller 10 shown in FIG. 4*a* and the control switch unit 30 is modified to FIG. 10*f*. When the shaft 331 of the encoder 33 is depressed, the contacts D and E are connected, and the enter key 34 is turned on. After the enter key 34 has been turned on, the shaft 331 is turned clockwise to increase selection control, and the signal output from contacts A and B is as shown in FIG. 10*e*, where the signal from contact B is produced about 2.6° after the signal from contact A. On the contrary, when the shaft 331 is turned counter-clockwise for decrease selection control, the signal from contact A is produced about 2.6° after the signal from contact B. The micro controller 10 determines increase selection control or decrease selection control subject to the phase difference between signal A and signal B.

It is to be understood that the drawings are designed for purposes of illustration only, and are not intended as a definition of the limits and scope of the invention disclosed.

What the invention claimed is:

1. A help service function control device added to a multi-sync (or multimode) monitor of a personal computer, comprising:

circuitry including a micro controller and software implemented by the micro controller, said circuitry and software being arranged to manage operation and adjustment of a connected monitor, and also to produce a function selection message and a level adjustment message which assists a user in providing appropriate inputs as necessary for managing the operation and adjustment control of the connected monitor;

a control switch unit havinng at least two control switches for causing said micro controller to produce said function selection message and said level adjustment message respectively;

an on-screen display controlled by said micro controller to produce characters and signs, and to output produced characters and signs to a video pre-amplifier, permitting a help service message to be displayed on a video display, wherein said help service message include installation procedures, adjustment procedures, and specifications of said monitor; and memory means for providing access to set data when said micro controller is a function selection or level adjustment.

2. The help service function control device of claim 1, wherein the control switches of said control switch unit are tact switches.

3. The help service function control device of claim 1, wherein the control switches of said control switch unit are formed by contacts of an encoder.

4. The help service function control device of claim 1, wherein said installation procedures include instructions for connection between the computer monitor and the computer.

5. The help service function control device of claim 1, wherein said specifications describe input characteristics, resolution and security confirmation of the monitor.

* * * * *